Patented Feb. 19, 1935

1,991,600

UNITED STATES PATENT OFFICE 1,991,600

HALOGENATION PROCESS

Richard M. Deanesly, Berkeley, Calif., assignor to Shell Development Company, San Francisco, Calif., a corporation of Delaware No Drawing. Application November 11, 1931,
Serial No. 574,461

11 Claims. (Cl. 260—166)

This invention relates to the halogenation of saturated hydrocarbons, whether paraffinic or aromatic in character, and particularly to the halogenation under conditions whereby an addition reaction and a substitution reaction takes place pari passu.

It is known that the paraffin hydrocarbons, aromatic hydrocarbons and other substances, such as aralkyl compounds, react only very slowly, if at all, with chlorine when the reaction mixture is in the dark. Daylight, in some cases strong sunlight, is necessary to induce reaction to take place at practical rates. The general reaction induced by light termed "substitution" is $$RH + Cl_2 \rightarrow RCl + HCl$$

Prior investigators, interested in chlorinating unsaturated compounds which were admixed with varying quantities of saturated hydrocarbons claimed that the execution of such process in the dark or in opaque vessels at low temperatures obviated or restricted substitution and the concomitant formation of hydrochloric acid.

Domestic patents to the present day state in no uncertain terms the impossibility of substantial chlorination by substitution in the dark, unless elevated temperatures, e. g. 150° C. and upwards are employed.

On the other hand the reaction termed "addition" which takes place between olefinic hydrocarbons or other compounds having an olefinic structure (olefines, acetylenes, diolefines, terpenes)

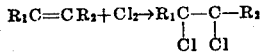

takes place readily in darkness.

Contrary to the statements in the prior art, I have found that substitution is induced to take place or catalyzed by addition. In the presence of molecules undergoing the addition reaction, other molecules will simultaneously undergo the substitution reaction in total darkness at rapid rates, even at ordinary temperatures.

The process is applicable with substantially pure individual saturated hydrocarbons and their admixtures with each other or with diluents. The physical state of the reactants is not limitative. Where difficulty has been experienced in the halogenation of methane and its homologues and aromatics as benzene, toluene and the like in the dark, I have found that rapid substitution as a rule can be caused to take place if an unsaturated compound be added to the hydrocarbon undergoing halogenation. Addition takes place readily under the existing conditions. This reaction simultaneously induces the substitution reaction which takes place pari passu yielding a mixture of substitution and addition products, even when the olefine present shall be more than sufficient in quantity to react with the whole of the chlorine introduced.

Experiments lead to the conclusion that the presence of one molecule undergoing the addition reaction, e. g.

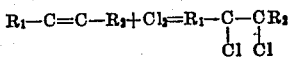

will induce as many $n$ molecules to undergo the substitution reaction for example $$RH + Cl_2 = RCl + HCl$$

This number $n$ should be understood as a maximum. If a mixture of olefine and paraffin in which the ratio of paraffin to olefine is less than $n:1$ be chlorinated the whole of both constituents will undergo their respective reactions with chlorine; but if the ratio of paraffin to olefine be more than $n:1$, the excess of paraffin will remain unreacted even when excess of chlorine is present. The exact value of $n$ depends both on the nature of the olefine and paraffin in question and also on the temperature and other external factors. In general for example when chlorinating butane in the presence of butylene at atmospheric pressure and temperatures between 0° and 30° C., the value of $n$ lies between 10 and 12.

This process is adapted for general halogenation although reference is had to chlorination for purposes of convenience. The halogenating agent may be employed in the uncombined state as a gas or liquid.

The process is preferably but not necessarily executed in the "mixed" phase, i. e. liquid hydrocarbon in equilibrium with its saturated vapor being simultaneously present in the reaction zone. This may be done in the specific manner described by S. C. Carney in his copending application 487,196 filed October 8, 1930. Chlorine is introduced into a reaction zone intermediate two fractionating zones of a conventional fractionation column. The reaction zone as well as the zones above and below may comprise one or more bubble cap plates or a packed section in structure entirely similar to that employed in the art of fractional distillation. Chlorine there comes into contact with ascending hydrocarbon vapor and descending hydrocarbon reflux. Reaction takes place and gaseous hydrogen chloride formed passes upwards with the excess of hydrocarbon vapor, while the products of chlorination being of lower vapor pressure than the hydrocarbons themselves are carried downwards from the reaction zone in the reflux. Unreacted hydrocarbon is separated from the hydrogen chloride and returned as reflux to the top of the upper fractionating section. The supply of fresh hydrocarbon may be introduced at any convenient point in the column—usually it is preferable to supply it at the top so that it shall contribute to the reflux—and the chlorinated products are withdrawn from the base of the column or the kettle below it either pure or admixed with a small amount of unreacted hydrocarbon as may be convenient.

The process is effective with temperatures ranging from below 0° C. (for example in the case of propane at its natural boiling point —41° C.) up to 100° C., or in the case of hydrocarbons of boiling point above 100° C. or 150° C. up to their natural boiling points.

For purposes of illustration only, reference will be had to the following example describing the effect of my invention:

The apparatus employed comprised a packed rectification column 1" in diameter at the midpoint of which chlorine was introduced. This column, 48" in height, was mounted on a still and in communication with a reflux condenser. It was possible to chlorinate butane in weak daylight at 0° C. at a rate of chlorine input up to 100 grams per hour without any unreacted chlorine reaching the still head. The reaction slowed down rapidly as daylight failed and was negligible in moderate artificial light. On the other hand when about 10% (or more) by weight of butylene was added to the butane, the reaction proceeded smoothly and rapidly at the same temperature and rate of chlorine input in total darkness; both butane and butylene being simultaneously chlorinated to yield respectively mono- and dichlor-butane.

When reference is had to the terms "dark" or "darkness", it is to be understood that there is meant thereby total darkness as well as an intensity of light insufficient in itself to substantially induce or stimulate the chain mechanism by which the substitution reaction is governed.

According to my process, the rate and direction of halogenation may be controlled through the amount and nature of the added unsaturated hydrocarbon.

Metallic and/or other opaque structural material for large scale operation may be used with consequent reduction of cost and increase of safety over apparatus constructed of or containing glass or other fragile transparent elements.

Halogen carriers, ultraviolet light, sunlight and the like are dispensed with in my process. Whereas the prior art states that methane begins to react in the dark with chlorine to a slight extent at 250° C., I have found that chlorination takes place rapidly in the dark at lower temperatures when an unsaturated hydrocarbon as an olefine, acetylene and the like has been added to the methane. The same is true with the homologues of methane.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. The process of halogenating a saturated organic compound which behaves like a paraffin hydrocarbon towards free halogen which comprises adding free halogen thereto in the dark in the presence of a small amount of an unsaturated organic compound capable of adding halogen.

2. The process of halogenating a saturated organic compound which behaves like a paraffin hydrocarbon towards free halogen which comprises adding free halogen to an aromatic compound in the dark in the presence of a small amount of an unsaturated organic compound capable of adding halogen.

3. The process of halogenating a saturated organic compound which behaves like a paraffin hydrocarbon towards free halogen which comprises adding free halogen to a saturated aliphatic compound in the dark in the presence of a small amount of an unsaturated organic compound capable of adding halogen.

4. The process of chlorinating a saturated organic compound which behaves like a paraffin hydrocarbon towards free halogen which comprises adding free chlorine thereto in the dark in the presence of a small amount of an unsaturated organic compound capable of adding chlorine.

5. The process of chlorinating a saturated organic compound which behaves like a paraffin hydrocarbon towards free halogen which comprises adding free chlorine to an aromatic compound in the dark in the presence of a small amount of an unsaturated organic compound capable of adding chlorine.

6. The process of chlorinating a saturated organic compound which behaves like a paraffin hydrocarbon towards free halogen which comprises adding free chlorine to a saturated aliphatic compound in the dark in the presence of a small amount of an unsaturated organic compound capable of adding chlorine.

7. The process of chlorinating a saturated organic compound which behaves like a paraffin hydrocarbon towards free halogen which comprises adding free chlorine to a paraffin hydrocarbon in the dark in the presence of a small amount of an unsaturated organic compound capable of adding chlorine, the reaction taking place at a temperature below 150° C.

8. The process of chlorinating a saturated organic compound which behaves like a paraffin hydrocarbon towards free halogen which comprises adding free chlorine to a paraffin hydrocarbon in the dark in the presence of a small amount of an olefine, the reaction taking place at a temperature below 150° C.

9. The process of chlorinating a saturated organic compound which behaves like a paraffin hydrocarbon towards free halogen which comprises adding free chlorine to a paraffin hydrocarbon in the dark in the presence of a small amount of an unsaturated organic compound capable of adding chlorine, the reaction taking place at a temperature below 100° C.

10. The process of chlorinating a saturated organic compound which behaves like a paraffin hydrocarbon towards chlorine by substitution, comprising, adding thereto a relatively small amount of an unsaturated hydrocarbon and chlorine and permitting the substitution and addition reactions to go side by side in the dark.

11. The process of chlorinating a paraffin hydrocarbon by substitution, comprising, adding thereto a relatively small amount of an olefine and chlorine and permitting the substitution and addition reactions to go side by side in the dark.

RICHARD M. DEANESLY.